M. BENZ.
VEHICLE WHEEL.
APPLICATION FILED JUNE 7, 1920.
1,375,203.
Patented Apr. 19, 1921.
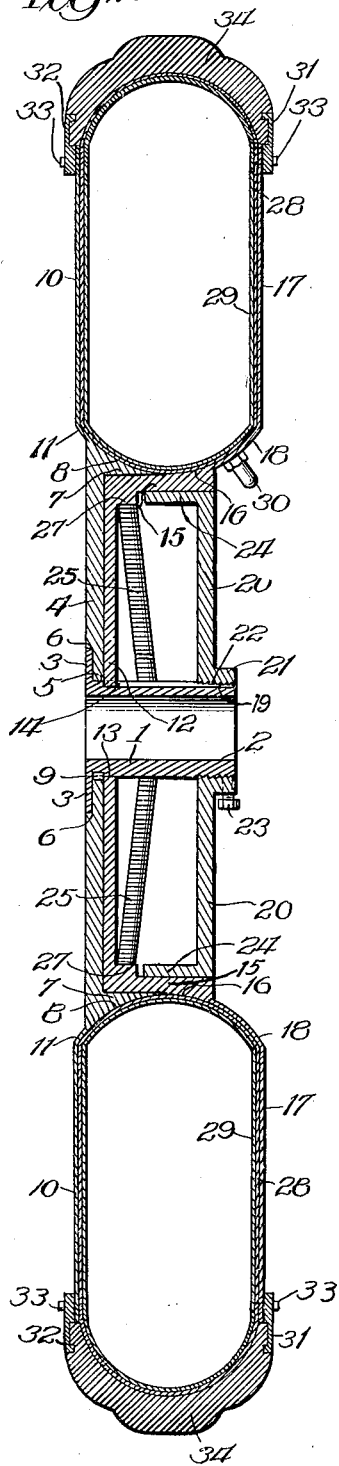
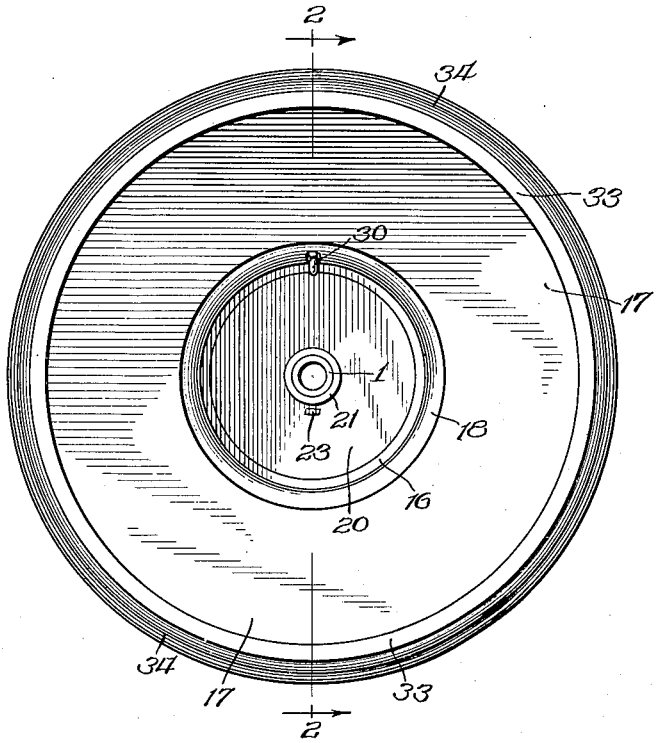
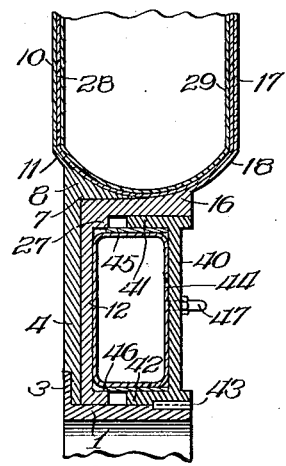
Inventor
Max Benz

UNITED STATES PATENT OFFICE.

MAX BENZ, OF SOUTH CHICAGO, ILLINOIS.

VEHICLE-WHEEL.

1,375,203. Specification of Letters Patent. Patented Apr. 19, 1921.

Application filed June 7, 1920. Serial No. 387,148.

*To all whom it may concern:*

Be it known that I, MAX BENZ, a citizen of the United States, and a resident of South Chicago, in the county of Cook and State of Illinois, have invented a new and useful Improvement in Vehicle-Wheels, of which the following is a full, clear, and exact description.

My invention relates to improvements in vehicle wheels, and it consists in the combinations, constructions, and arrangements herein described and claimed:

An object of my invention is to provide a novel form of vehicle wheel having means in itself for absorbing and dissipating the shocks and jars encountered in service.

A further object of my invention is to provide a device of the type described in which a resilient means is arranged between the rim and the hub.

A further object of my invention is to provide a device of the type described in which provision is made for obtaining a greater resiliency than usual in a wheel of a given size without increasing the dimensions of the wheel.

A further object of my invention is to provide a device of the type described in which a solid tire is received and engaged by a pair of outer rim members and a pneumatic tube is arranged between the solid tire and the hub of the wheel, thereby safeguarding the pneumatic tube from punctures without lessening the resiliency of the wheel.

A further object of my invention is to provide a device of the type described that is strong and durable in construction and thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a face view of the device,

Fig. 2 is an enlarged section along the line 2—2 of Fig. 1,

Fig. 3 is an enlarged sectional view of a fragmentary portion of a modified form of the device.

In carrying out my invention, I provide a hub 1 having a central bore 2 adapted to receive an axle (not shown) and formed with a flange 3 at one end. A disk 4, having a central opening 5 surrounded by an annular recess 6, which is formed in one face of the disk 4, is mounted upon one end of the hub 1. The flange 3 is received within the annular recess 6, as shown in the accompanying drawings. The disk 4 is rigidly secured to the hub 1 by a key 9. It will be further noted that the disk 4 is fashioned with a laterally extending annular rib or felly member 7, the inner side of which extends at right angles to the disk 4. The outer or peripheral face 8 of the annular rib 7 is curved, as shown in the drawings, thereby causing the edge of the annular rib 7 to terminate in a point.

A rim flange 10, which has its inner portion 11 curved to conform to the curved face 8 of the annular rib 7, as clearly shown in Fig. 2 of the accompanying drawings, is formed integrally with the disk 4. It is, of course, obvious that the rim flange 10 may be formed separately and may be rigidly secured to the disk 4 in any suitable manner.

A second disk 12, which has a diameter slightly less than the distance between two diametrically opposite points on the inner face of the annular rib 7, is formed with a central opening 13 in which the hub 1 is slidably disposed. Rotatable movement of the disk 12 is prevented by a feather 14, although the disk 12 may be moved longitudinally along the hub 1. It will be noted that the disk 12 is moved along the hub 1 into contact with the disk 4 and an annular laterally extending felly member 15 is in contact with the inner face of the annular rib 7. The outer face 16 of the annular laterally extending felly member 15 is curved adjacent its edge to conform with the contour of the curved face 8 of the annular rib 7.

A third disk 20 is formed with a laterally extending collar 21 and with a central threaded opening 22. The disk 20 is screwed on the end of the hub 1 which is formed with a threaded portion 19 for that purpose. The disk 20 is also formed with a laterally extending annular portion 24 which fits within the annular laterally extending portion 15 of the second disk 12. It will be noted that the annular felly member 15 extends laterally a greater distance than the annular portion 24. A set screw 23 is provided for regulating the rotatable movement of the third disk 20 which acts as a brace for the disk 4 and the disk 12.

The disk 12 is formed with an annular shoulder 27. A plurality of inclined coil springs 25, extend radially from the hub and are positioned at spaced distances apart. The inner ends of the springs 25 are rigidly secured to the hub 1 in any suitable manner, no means being shown in the accompanying drawings. The outer ends of the coil springs 25 are rigidly secured to the annular shoulder 27. A second rim 17 having a curved inner portion 18 is formed integrally with the laterally extending annular portion 15 of the disk 12 or may be formed separately and rigidly secured thereto in any suitable manner. A pneumatic tube 29 is disposed between the rim flanges 10 and 17 as shown. A liner 28, which is made of any suitable material, such as convas, or the like, covers the pneumatic tube 29 and is disposed between the same and the rim flanges 10 and 17 thereby protecting the former. An air inlet valve 30 for the pneumatic tube 29 extends through the liner 28 and the rim flange 17, as clearly shown in Fig. 2 of the accompany drawings. A pair of auxiliary rim members 31 and 32, are secured at the outer edges of the rim flanges 10 and 17 in any suitable manner, as by bolts 33. It will be noted that solid tire or tread 34 is securely maintained in position between the auxiliary rim members 31 and 32 when the latter are bolted to the rim flanges 10 and 17 and may be dismounted therefrom without disassembling the device.

From the foregoing description of the various parts of the device, the operation thereof may be readily understood. When the pneumatic tube is inflated by means of air pumped through the inlet valve 30, the pressure of the air in the tube will tend to move the disk 12 away from the disk 4. This tendency will be counterbalanced by the pressure of the coil springs 25 which press against the annular shoulder 27, although a limited space is provided between the annular shoulder 27 and the adjacent edge of the annular laterally extending portion 24. Likewise, when shocks and jars are encountered, the pressure against the solid tire will be transmitted therethrough and will tend to move the disk 12 in the direction of the disk 20. In case of a severe shock, the disk 12 may move until the shoulder 27 is in contact with the edge of the laterally extending portion 24, but ordinarily the pressure of the spring 25 will be sufficient to counteract the pressure occasioned by shocks and jars and the disk 12 will not be perceptibly moved in the direction of the disk 20. It will be noted that the distance between the inner and outer surfaces of the pneumatic tube 29 is considerably greater than the distance between the sides thereof. Consequently, a greater resiliency than ordinary is obtained in a wheel of a given size without increasing the dimensions of the wheel. Furthermore, shocks and jars received by a tire are uniformly distributed and are absorbed by the entire wheel. In Fig. 3 of the accompanying drawings I show a fragmentary portion of the modified form of the device. I have indicated corresponding parts in the preferred and modified forms of the device by the same reference numerals and shall confine my description of the modified form of the device to the parts which differ in structure from those provided in the preferred form of the device.

It will be noted that I provide a disk 40 which is formed with an annular laterally extending flange 41 at its outer edge and with a second annular laterally extending flange 42 at its inner edge. The disk 40 is mounted upon the end of the hub 1 and is rigidly secured thereto by means of a key 43. Instead of the coil springs 25 as found in the preferred form of the device, I provide a penumatice tube 44 which is disposed between the adjacent faces of the disks 12 and 40. Flat bands 45 and 46 are arranged concentrically with respect to the hub to protect the outer and inner edges of the pneumatic tube 44. An air inlet valve 47 for the pneumatic tube 44 extends through the disk 40.

The operation of the modified form of the device is similar to that of the preferred form of the device. The pneumatic tube 44 absorbs the shocks and jars transmitted from the outer pneumatic tube and otherwise performs the functions of the coil springs 25. The bands 45 and 46 limit the lateral movement of the disk 12 and prevent the pneumatic tube 44 from being damaged by frictional contact with the disks 12 and 40.

It is to be noted that the rim flanges 10 and 17 together with the curved portions 8 and 16 of the felly members 7 and 15, respectively, form a substantially U-shaped rim. The curved surface 16 is yieldingly movable laterally a limited distance with respect to the curved surface 8. The inclined position of the coil spring 25 tends to maintain the curved surface 16 in the position pictured in Fig. 2 of the drawings.

I claim:

1. A vehicle wheel comprising a hub, a substantially U-shaped rim consisting of two felly members, one being movable laterally with respect to the other, and a rim flange formed integrally with each of said felly members, a pneumatic tube disposed within said U-shaped rim, a solid tire concentrically superposed upon said pneumatic tube, means for preventing lateral movement of said solid tire, means arranged between said rim and the hub for rigidly maintaining the former in its radial position relative to the latter, and means mounted on the hub and engaging with said movable felly member to yieldingly permit a lateral movement of the movable felly member away from the fixed felly member.

2. A vehicle wheel comprising a hub, a disk rigidly mounted on said hub adjacent one end thereof, a laterally extending annular felly member formed integrally with said disk, a second disk feathered on said hub and slidable longitudinally therealong, said second named disk being formed with a laterally extending annular felly member, a third disk removably secured to the hub, said third named disk having an integral annular extension arranged to extend toward said second named disk to limit the slidable movement of the latter along the hub, means mounted on said hub and engaging with said second named felly member for yieldingly permitting a limited movement of said second named disk away from said first named disk, a rim flange formed integrally with each of said felly members, a pneumatic tube having its inner periphery mounted upon said felly members and having its sides disposed between said rim flanges, a solid tire concentrically superposed upon said pneumatic tube, and means preventing lateral displacement of said solid tire.

3. A vehicle wheel comprising a hub, a substantially U-shaped rim consisting of two felly members, one being movable laterally with respect to the other, and a rim flange formed integrally with each of said felly members, a pneumatic tube partly disposed within said U-shaped rim, a solid tire concentrically superposed upon said pneumatic tube, means for preventing lateral displacement of said solid tire, means arranged between said rim and the hub for maintaining the former in its radial position relative to the latter, and a plurality of radially extending spaced apart compression springs mounted on said hub and engaging with said movable felly member to yieldingly permit lateral movement of the movable felly member away from the fixed felly member.

MAX BENZ.